(12) United States Patent
Jakowski et al.

(10) Patent No.: US 10,402,338 B2
(45) Date of Patent: Sep. 3, 2019

(54) METHOD AND APPARATUS FOR ERASE BLOCK GRANULARITY EVICTION IN HOST BASED CACHING

(71) Applicant: Intel Corporation, Santa Clara, CA (US)

(72) Inventors: Andrzej Jakowski, Chandler, AZ (US); Kapil Kumar Karkra, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 15/477,037

(22) Filed: Apr. 1, 2017

(65) Prior Publication Data

US 2018/0285282 A1   Oct. 4, 2018

(51) Int. Cl.

| G06F 12/08 | (2016.01) |
|---|---|
| G06F 12/0897 | (2016.01) |
| G06F 12/02 | (2006.01) |
| G06F 12/0804 | (2016.01) |
| G06F 12/0811 | (2016.01) |
| G06F 12/121 | (2016.01) |

(52) U.S. Cl.
CPC ...... *G06F 12/0897* (2013.01); *G06F 12/0246* (2013.01); *G06F 12/0804* (2013.01); *G06F 12/0811* (2013.01); *G06F 12/121* (2013.01); *G06F 2212/1024* (2013.01); *G06F 2212/222* (2013.01); *G06F 2212/7205* (2013.01)

(58) Field of Classification Search
CPC ............. G06F 12/0246; G06F 12/0891; G06F 12/0897; G06F 12/126; G06F 2212/1021; G06F 2212/1024; G06F 2212/222

USPC ................................ 711/103, 133, 135, 143
See application file for complete search history.

(56) References Cited

U.S. PATENT DOCUMENTS

| 8,549,222 B1 * | 10/2013 | Kleiman | ............... G06F 3/0613 |
| | | | 711/103 |
| 8,918,588 B2 * | 12/2014 | Bass | ..................... G06F 12/121 |
| | | | 711/118 |
| 2001/0014058 A1 * | 8/2001 | Ando | ................. G11B 20/1217 |
| | | | 369/32.01 |

(Continued)

OTHER PUBLICATIONS

Choi et al., NVM Express, Inc.; "NVM Express Technical Proposal for New Feature" ; Nov. 9, 2016; 20 pages.

(Continued)

*Primary Examiner* — Gary J Portka
(74) *Attorney, Agent, or Firm* — Alliance IP, LLC (57) ABSTRACT

In one embodiment, a processor comprises a processing core; and a cache controller to send a plurality of write requests to a cache storage device to store cache lines of a stream block, the plurality of write requests each including a stream identifier of the stream block, wherein a capacity of the stream block is equal to a capacity of an erase block of the cache storage device and wherein the erase block is dedicated to storing cache lines of the stream block; determine to evict the stream block from the cache storage device based upon a determination that space is not available in the cache storage device to cache data received from a first storage device; and send a deallocation request to the cache storage device to deallocate all cache lines of the stream block to enable the cache storage device to erase the erase block.

21 Claims, 5 Drawing Sheets

(56) References Cited

U.S. PATENT DOCUMENTS

2006/0129757 A1* 6/2006 Scherzer .............. G06F 1/3203
　　　　　　　　　　　　　　　　　　711/113

OTHER PUBLICATIONS

Martin, Information Technology—SCSI Block Commands—4 (SBC-4); Working Draft American National Standard, T10/BSR INCITS 506, Revision 12a; Oct. 19, 2016; 432 pages.

* cited by examiner

METHOD AND APPARATUS FOR ERASE BLOCK GRANULARITY EVICTION IN HOST BASED CACHING

FIELD

The present disclosure relates in general to the field of computer development, and more specifically, to host based caching.

BACKGROUND

A computer system may include one or more central processing units (CPUs) which may communicate with one or more storage devices. A CPU may include a processor to execute an operating system and/or other software applications that utilize a storage device coupled to the CPU. The software applications may write data to and read data from the storage device.

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
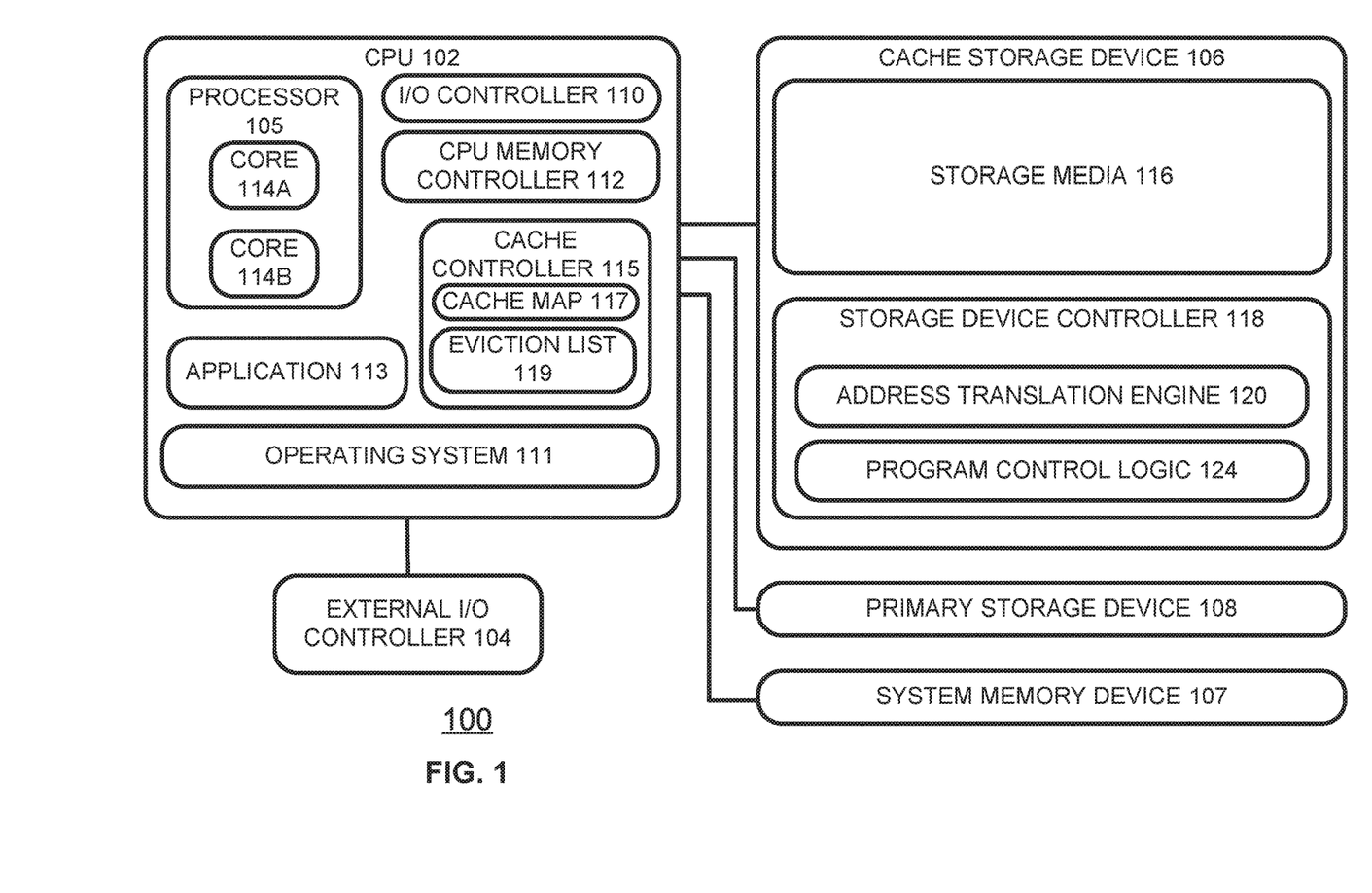
FIG. 1 illustrates a block diagram of components of a computer system in accordance with certain embodiments.

FIG. 1 illustrates a block diagram of components of a computer system 100 in accordance with certain embodiments. System 100 includes a central processing unit (CPU) 102 coupled to an external input/output (I/O) controller 104, a cache storage device 106, a primary storage device 108, and a system memory device 107. During operation, data may be transferred between cache storage device 106 and CPU 102, between primary storage device 108 and CPU 102, between system memory device 107 and CPU 102, or between any of cache storage device 106, primary storage device 108, and system memory device 107. In various embodiments, particular data operations (e.g., read, write, and/or erase operations) involving a cache storage device 106, primary storage device 108, or system memory device 107 may be issued by an operating system 111 and/or other logic (e.g., application 113 or cache controller 115) executed by processor 105.

System 100 may implement host based caching. In a host based caching system, a host computing device (e.g., CPU 102) executes logic that controls the caching of data stored on a first storage device (e.g., primary storage device 108) to a second storage device (e.g., cache storage device 106) that is relatively low latency compared to the first storage device. When data that is not currently cached by the host is requested by an application (e.g., application 113) executed by the host, the data may be retrieved from primary storage device 108 and stored in memory that may be accessed more easily by the host computing device (i.e., the data may be cached by the host). For example, data retrieved from primary storage device 108 may be cached by storing the retrieved data in cache storage device 106, system memory device 107, and/or one or more lower level caches of CPU 102. After the data is cached, the data may be retrieved from the device storing the cached data rather than primary storage device 108, thus reducing the amount of latency for data accesses by the host.

In various embodiments, accesses from the primary storage device 108 may have higher latencies than accesses from the cache storage device 106. For example, in a particular embodiment, the primary storage device is a relatively large but slow storage device, such as a hard disk drive (HDD) or tape drive, while the cache storage device 106 is a relatively small (as compared to the primary storage device) but fast storage device, such as a solid state drive (SSD) or a Non-volatile memory Dual in line Module (NVDIMM). The cache storage device 106 may function as a cache for data retrieved from the primary storage device 108. The cache controller of the host controls the caching operations performed on the cache storage device 106. The host based caching system may utilize any number of levels of caches, including (in order of decreasing access latency) the cache storage device 106, the system memory device 107, and one or more caches located on CPU 102 (e.g., a last level cache, an L2 cache, an L1 cache, etc.).

In particular cache storage devices (e.g., those utilizing NAND flash memory), logical blocks of memory storing invalid data must first be erased before they can store different data. In a particular embodiment, an erase block of cache storage device 106 represents the smallest unit of the cache storage device 106 that may be erased. Erase blocks are typically much larger than the smallest unit of the cache storage device 106 that may be written to (sometimes referred to as a logical block or page). For example, a typical logical block may have a capacity of 512 bytes, 1 Kilobyte (KB), 2 KB, 4 KB, or other suitable size, while an erase block may comprise a block having a capacity of 512 KB, 1 MB, 2 MB or other capacity. In general, an erase block may comprise a large number of logical blocks.

In typical host based caching systems, data is inserted into a cache such as cache storage device 106 with a granularity of one or more logical blocks. The granularity of the data that is inserted into the cache may be referred to as a cache line. Thus, a cache may include a plurality of cache lines that each include one or more logical blocks of data. In various embodiments, each cache line may be a single logical block, each cache line may be two logical blocks, each cache line may be four logical blocks, etc.

In a typical host based caching system in which logical blocks must be erased before being used again (e.g., when a cache storage device utilizes NAND flash memory to store cached data), when a cache line is updated by the host, the host may issue a deallocate request specifying one or more logical blocks corresponding to the cache line to the cache storage device to instruct the cache storage device to mark the one or more logical blocks corresponding to the cache line as invalid and may write the updated cache line to a new location of the cache storage device. However, this approach may cause random invalidity within the cache storage device (e.g., the invalidated blocks may be spread across multiple erase blocks). Later, when the cache storage device runs out of space it may reclaim an erase block by copying valid data within the erase block to a new location on the cache storage device 106 and then erasing the entire erase block. However, this additional copying introduces undesirable endurance and performance effects on the caching system.

In various systems, an application and/or other logic of the host merely specifies a logical block address (LBA) for a logical block of data in a write request, but has no further control over the eventual physical storage location of the logical block of data on the cache storage device (the cache storage device will translate the LBA into a physical address before storing the data). However, in various embodiments of the present disclosure, an application 113 or cache controller 115 may provide guidance to the cache storage device 106 regarding the physical location at which data block(s) specified by a write request are to be stored in cache storage device 106. In a particular embodiment, the application 113 or cache controller 115 may specify the erase block on which data specified by a write request is to be stored. As one example, application 113 may utilize Directive Type Streams (e.g., as proposed for the NVMe specification in Technical Proposal 008a available at www.nvmexpress.org/wp-content/uploads/NVMe_1_3_TP_008a_Directives_201612_08.docx) or other mechanism that allows an application 113 or cache controller 115 to specify, at least at a coarse granularity, the physical location of data to be stored on cache storage device 106. Directive Type Streams provide a mechanism for the application 113 or cache controller 115 to indicate to the cache storage device 106 that logical blocks specified in different write requests are part of the same stream (i.e., group of associated data). This information may be used by the cache storage device 106 for media allocation techniques (e.g., to store related data in close physical proximity, such as on the same erase block). A stream of data may refer to any collection of data, such as a file, a log, data written by a particular application 113, or other related data.

A cache storage device 106 that is compatible with Directive Type Streams or similar mechanism that allows the ability to store related data in physical proximity with each other may be configured with a stream granularity size (SGS) that specifies the capacity of a stream (i.e., the maximum size of the stream). In particular embodiments of the present disclosure, the SGS or similar stream capacity parameter of a cache storage device 106 is set equal to the erase block size of cache storage device 106 such that logical blocks of a particular stream written to the cache storage device 106 are stored on the same erase block of the cache storage device 106. Thus, the host may instruct the cache storage device 106 to collocate related data on the same erase block by passing the same stream identifier to the cache storage device 106 in each write request specifying one or more logical data blocks of the stream.

When this related data is eventually evicted (i.e., removed) from the cache, the entire stream is deleted and the entire erase block can be reclaimed without employing the garbage collection mechanism of the cache storage device 106 (which would generally require the cache storage device to identify valid cache lines within the erase block and relocate the valid cache lines before the erase block is erased and reused). Rather, the host may simply issue a deallocate request to the cache storage device 106 to deallocate the entire erase block and the cache storage device 106 may then erase the erase block. As an example, to deallocate an entire stream, the deallocate request from the host may specify the LBAs of the stream in any suitable manner (when the LBAs are consecutive the request may include a starting LBA of the stream and a length of the stream).

Various embodiments of the present disclosure provide technical advantages such as reduced data movement inside cache storage device 106, improved endurance of cache storage device 106, improved system performance (since valid data does not need to be moved to a new location when a stream is evicted), improved Quality of Service due to reduced collision between I/O operations initiated by the cache storage device and garbage collection activity, reduced garbage collection processing by the cache storage device 106, and/or power savings.

CPU 102 comprises a processor 105, such as a microprocessor, an embedded processor, a DSP, a network processor, a handheld processor, an application processor, a co-processor, an SOC, or other device to execute code (i.e., software instructions). Processor 105, in the depicted embodiment, includes two processing elements (cores 114A and 114B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices, which may refer to any suitable logic capable of transferring data to and/or receiving data from an electronic system, such as CPU 102. For example, an I/O device may comprise a controller of an audio/video (A/V) device such as a graphics accelerator; a controller of a data storage device (e.g., cache storage device 106 or primary storage device 108), such as an SSD, HDD, NVDIMM, or optical storage disk; a wireless transceiver; a network processor; a network interface controller; or a controller for another input device such as a monitor, printer, mouse, keyboard, or scanner; or other suitable device. In a particular embodiment, an I/O device may comprise storage device controller 118 of cache storage device 106 or a storage device controller (not shown) of primary storage device 108.

An I/O device may communicate with the I/O controller 110 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), Institute of Electrical and Electronics Engineers (IEEE) 802.3, IEEE 802.11, or other current or future signaling protocol. In particular embodiments, I/O controller 110 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 102) or may be integrated on the same chip as the CPU 102.

CPU memory controller 112 is an integrated memory controller that includes logic to control the flow of data going to and from one or more system memory devices 107. CPU memory controller 112 may include logic operable to read from a system memory device 107, write to a system memory device 107, or to request other operations from a system memory device 107. In various embodiments, CPU memory controller 112 may receive write requests from cores 114 and/or I/O controller 110 and may provide data specified in these requests to a system memory device 107 for storage therein. CPU memory controller 112 may also read data from a system memory device 107 and provide the read data to I/O controller 110 or a core 114. During operation, CPU memory controller 112 may issue commands including one or more addresses of the system memory device 107 in order to read data from or write data to memory (or to perform other operations). In some embodiments, CPU memory controller 112 may be implemented on the same chip as CPU 102, whereas in other embodiments, CPU memory controller 112 may be implemented on a different chip than that of CPU 102. I/O controller 110 may perform similar operations with respect to one or more storage devices 106.

The CPU 102 may also be coupled to one or more other I/O devices (such as any of those listed above or other suitable I/O devices) through external I/O controller 104. In a particular embodiment, external I/O controller 104 may couple a cache storage device 106 and/or a primary storage device 108 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

A system memory device 107 may store any suitable data, such as data used by processor 105 to provide the functionality of computer system 100. For example, data associated with programs that are executed by or files accessed by cores 114 may be stored in system memory device 107. Thus, a system memory device 107 may include a system memory (sometimes referred to as a main memory) that stores data and/or sequences of instructions that are executed or otherwise used by the cores 114. In various embodiments, a system memory device 107 may store persistent data (e.g., a user's files or instruction sequences) that maintains its state even after power to the system memory device 107 is removed. A system memory device 107 may be dedicated to a particular CPU 102 or shared with other devices (e.g., one or more other processors or other device) of computer system 100. In various embodiments, system memory device 107 may be coupled to a last level cache of CPU 102 and the last level cache may check system memory device 107 to determine whether a particular data block is stored by the system memory device 107 prior to requesting the data block from cache storage device 106 and/or primary storage device 108.

In various embodiments, a system memory device 107 may include a memory comprising any number of memory modules, a memory device controller, and other supporting logic (not shown). A memory module may include non-volatile memory and/or volatile memory.

Non-volatile memory is a storage medium that does not require power to maintain the state of data stored by the medium. In various embodiments, non-volatile memory may be byte or block addressable. Nonlimiting examples of nonvolatile memory may include any or a combination of: solid state memory (such as planar or 3-dimensional (3D) NAND flash memory or NOR flash memory), 3D crosspoint memory, memory that uses chalcogenide phase change material (e.g., chalcogenide glass), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), a memristor, single or multi-level phase change memory (PCM), Spin Hall Effect Magnetic RAM (SHE-MIRAM), and Spin Transfer Torque Magnetic RAM (STTRAM).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In some embodiments, any portion of system memory 107 can comply with Joint Electron Device Engineering Council (JEDEC) standards including but not limited to Double Data Rate (DDR) standards, e.g., DDR3, 4, and 5, or Low Power DDR4 (LPDDR4) as well as emerging standards.

Cache controller 115 performs operations associated with the caching of data at cache storage device 106. Although the cache controller 115 is depicted as separate from the operating system 111 and the I/O controller 110, in various embodiments, all or a portion of the cache controller 115 may be integrated with the operating system 111 and/or I/O controller 110. Cache controller 115 may be implemented using any suitable logic, such as software, hardware, or a combination thereof.

Cache controller 115 may be operable to receive a read or write request (e.g., from application 113) and determine whether the data referenced by the request is stored in cache storage device 106. In various embodiments, the cache controller 115 may access a cache map 117 to determine whether data is located in cache storage device 106. For the various cache lines stored in cache storage device 106 (which may each occupy one or more logical blocks of the cache storage device), cache map 117 may map an LBA of primary storage device 108 to an LBA of a corresponding cache line (i.e., an LBA of the cache storage device). Thus, when application 113 issues a data access request referencing an LBA of primary storage device 108, the cache controller 115 can determine whether the LBA of the primary storage device 108 is mapped to an LBA of a cache line in the cache storage device 106 in order to determine whether the data is stored by cache storage device 106.

When data that is not in the cache storage device 106 (or other lower level cache) is requested, the data may be obtained from primary storage device 108 and the cache controller 115 may issue a write request to the cache storage device 106 to effectuate caching of the data in a cache line of the cache storage device 106. The cache map 117 may be updated to map the requested LBA (i.e., the LBA of the primary storage device) to the LBA of the cache line in the cache storage device 106.

The cache map 117 may also include, for each cache line of cache storage device 106, an indication of whether the cache line is valid or invalid, an indication of whether the cache line is dirty or clean, and an indication of whether the cache line is free (i.e., whether the cache line may be written to). A cache line is marked as valid when data is written to the cache line in the cache storage device 106. The cache line may become invalid when the data stored at the cache line is overwritten (e.g., when an application issues a write request for the corresponding LBA of the primary storage device 108). When the data is changed, the outdated data remains in the cache line (and the cache line is marked as invalid) and the updated data is written to a new cache line (which is marked as valid). The overwriting of the data will also result in a remapping in the cache map 117 of the LBA of the primary storage device 108 to the LBA of the new cache line.

A cache line is marked as clean when the contents of the cache line match the contents of the corresponding data in primary storage device 108. When the host updates the data at cache storage device 106, but the data has not yet been updated at primary storage device 108, the cache line may be marked as dirty.

A cache storage device 106 or primary storage device 108 may store any suitable data, such as data used by processor 105 to provide functionality of computer system 100. For example, data associated with programs that are executed or files accessed by cores 114A and 114B may be stored in cache storage device 106 or primary storage device 108. In various embodiments, a cache storage device 106 or primary storage device 108 may store persistent data (e.g., a user's files or software application code) that maintains its state even after power to the cache storage device 106 or primary storage device 108 is removed. A cache storage device 106 or primary storage device 108 may be dedicated to CPU 102 or shared with other devices (e.g., another CPU or other device) of computer system 100.

In the embodiment depicted, cache storage device 106 includes a storage device controller 118 and storage media 116. Storage media 116 includes a plurality of memory cells that are each operable to store one or more bits of data. The cells of storage media 116 may be arranged in any suitable fashion, such as in rows (e.g., wordlines) and columns (e.g., bitlines), three dimensional structures, sectors, or other manner. In various embodiments, the cells may be logically grouped into banks, blocks, subblocks, wordlines, pages, frames, bytes, or other suitable groups.

In various embodiments, cache storage device 106 may comprise a solid state drive; a hard disk drive; a memory card; a Universal Serial Bus (USB) flash drive; a Non-Volatile Dual In-line Memory Module (NVDIMM); storage integrated within a device such as a smartphone, camera, or media player; or other suitable mass storage device. In a particular embodiment in which cache storage device 106 is a solid state drive or NVDIMM, storage media 116 comprises NAND flash memory. However, storage media 116 may include any of the volatile or non-volatile memories listed above or other suitable memory.

In particular embodiments, storage media 116 includes non-volatile memory. In particular embodiments, storage media 116 with non-volatile memory may comply with one or more standards for non-volatile memory promulgated by the Joint Electron Device Engineering Council (JEDEC), such as JESD218, JESD219, JESD220-1, JESD220C, JESD223C, JESD223-1, or other suitable standard (the JEDEC standards cited herein are available at www.jedec.org). In particular embodiments, the storage device comprises NAND flash memory that complies with one or more portions of a standard promulgated by JEDEC for SDRAM memory, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices that implement such standards may be referred to as DDR-based interfaces. For example, a cache storage device 106 comprising NAND flash memory may receive a command that has a format compliant with a DDR-based standard and may translate the command into one or more commands that are compatible with NAND flash memory of the cache storage device 106. Similarly, the cache storage device 106 may format results from operations performed on the NAND flash memory into a format that is compliant with a DDR-based standard before transmitting the results to the CPU 102.

Cache storage device 106 may include any suitable interface to communicate with CPU memory controller 112 or I/O controller 110 using any suitable communication protocol such as a DDR-based protocol, PCI, PCIe, USB, SAS, SATA, FC, System Management Bus (SMBus), or other suitable protocol. A cache storage device 106 may also include a communication interface to communicate with CPU memory controller 112 or I/O controller 110 in accordance with any suitable logical device interface specification such as NVMe, AHCI, or other suitable specification. In particular embodiments, cache storage device 106 may comprise multiple communication interfaces that each communicate using a separate protocol with CPU memory controller 112 and/or I/O controller 110.

Storage device controller 118 may include logic to receive requests from CPU 102 (e.g., via CPU memory controller 112 or I/O controller 110), cause the requests to be carried out with respect to storage media 116, and provide data associated with the requests to CPU 102 (e.g., via CPU memory controller 112 or I/O controller 110). Controller 118 may also be operable to detect and/or correct errors encountered during memory operation. In an embodiment, controller 118 may also track the number of times particular cells (or logical groupings of cells) have been written to in order to perform wear leveling and/or to detect when cells are nearing an estimated number of times they may be reliably written to. In performing wear leveling, the storage device controller 118 may evenly spread out write operations among blocks of the memory of storage media 116 such that particular blocks are not written to more than other blocks. In various embodiments, controller 118 may also monitor various characteristics of the cache storage device 106 such as the temperature or voltage and report associated statistics to the CPU 102. Storage device controller 118 can be implemented on the same circuit board or device as storage media 116 or on a different circuit board, or device. For example, in some environments, storage device controller 118 may be a centralized storage controller that manages memory operations for multiple different storage media 116 (which could each be of the same type of memory or could be of different types) of computer system 100 (and thus could provide storage device controller functionality described herein to any of the memories to which it is coupled).

In various embodiments, the cache storage device 106 also includes an address translation engine 120. In the depicted embodiment, the address translation engine 120 is shown as part of the storage device controller 118, although in various embodiments, the address translation engine 120 may be separate from the storage device controller 118 and communicably coupled to the storage device controller 118. In various embodiments, the address translation engine 120 may be integrated on the same chip or package as the storage device controller 118 or on a different chip or package.

In various embodiments, address translation engine 120 may include logic (e.g., one or more logic-to-physical (L2P) address tables) to store and update a mapping between a logical address space (e.g., an address space visible to a computing host coupled to the cache storage device 106) and the physical address space of the storage media 116 of the cache storage device 106 (which may or may not be exposed to the computing host). The logical address space may expose a plurality of logical groups of data which are physically stored on corresponding physical groups of memory addressable, by the cache storage device 106, through the physical address space of the cache storage device 106. Thus, the L2P address table may translate between an LBA of a cache line and a physical address of the cache line. A physical address of the physical address space may comprise any suitable information identifying a physical memory location (e.g., a location within storage media 116) of the cache storage device 106, such as an identifier of the cache storage device 106 on which the physical memory location is located, an identifier of a module (such as a package, chip, memory array, disk or other module) of the storage media 116 on which the physical memory location is located, one or more pages of the physical memory location, one or more subblocks of the physical memory location, one or more wordlines of the physical memory location, one or more bitlines of the physical memory location, one or more disk sectors of the physical memory location, and/or other suitable identifiers or encodings thereof. In general, a logical address and a corresponding physical address have the same granularity. For example, a logical address comprising an LBA may correspond to a physical address of a physical block of memory of the cache storage device 106. In a particular embodiment, an LBA specifies the minimum amount of data that may be referenced using a write command (which may sometimes be referred to as a page). In various example, a logical address may refer to a block size of 512 bytes, 1 Kilobyte (KB), 2 KB, 4 KB, or other suitable block size.

The address translation engine 120 or other portion of cache storage device 106 may include any suitable memory type for storing logical to physical mapping structures and related information and any suitable logic for changing values stored in the logical to physical mapping structures (e.g., in response to a request from the storage device controller 118) and reading values from the logical to physical mapping structures (e.g., to provide the values to the storage device controller 118 for use in memory operations).

Storage media for the logical to physical mapping structures and other information may be included within the address translation engine 120 and/or storage device controller 118 or may be communicably coupled to the address translation engine and/or storage device controller. In various embodiments, storage media for the logical to physical mapping structures and other information may be integrated on the same package or chip as the storage device controller 118 and/or address translation engine 120 or may be implemented on a separate package or chip.

In various embodiments, the address translation engine 120 and/or storage device controller 118 may provide wear leveling through management of the address mappings of the logical to physical mapping structures and other information. In particular embodiments, the address translation engine 120 and/or storage device controller 118 may also prevent the use of bad memory cells (or logical grouping of cells) by not allowing physical addresses for the bad cells (or logical grouping of cells) to be mapped to the logical address space.

In various embodiments, the cache storage device 106 also includes program control logic 124 which is operable to control the programming sequence performed when data is written to or read from storage media 116. In various embodiments, program control logic 124 may provide the various voltages (or information indicating which voltages should be provided) that are applied to memory cells during the programming and/or reading of data (or perform other operations initiating data reads or writes), perform error correction, and perform other suitable functions (such as perform garbage collection).

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 may be located on the same package or chip as storage media 116.

In various embodiments, primary storage device 108 may include any one or more of the components described above with respect to cache storage device 106 or similar components. In particular embodiments, primary storage device 108 may be a SSD, HDD, tape drive, or other suitable mass storage device.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (i.e., on-chip) or package or any of the elements of CPU 102 may be located off-chip or off-package. Similarly, the elements depicted in cache storage device 106 may be located on a single chip or on multiple chips. In various embodiments a cache storage device 106 and a computing host (e.g., CPU 102) may be located on the same circuit board or on the same device and in other embodiments the cache storage device 106 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the cache storage device 106 and/or primary storage device 108 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Figure 2:
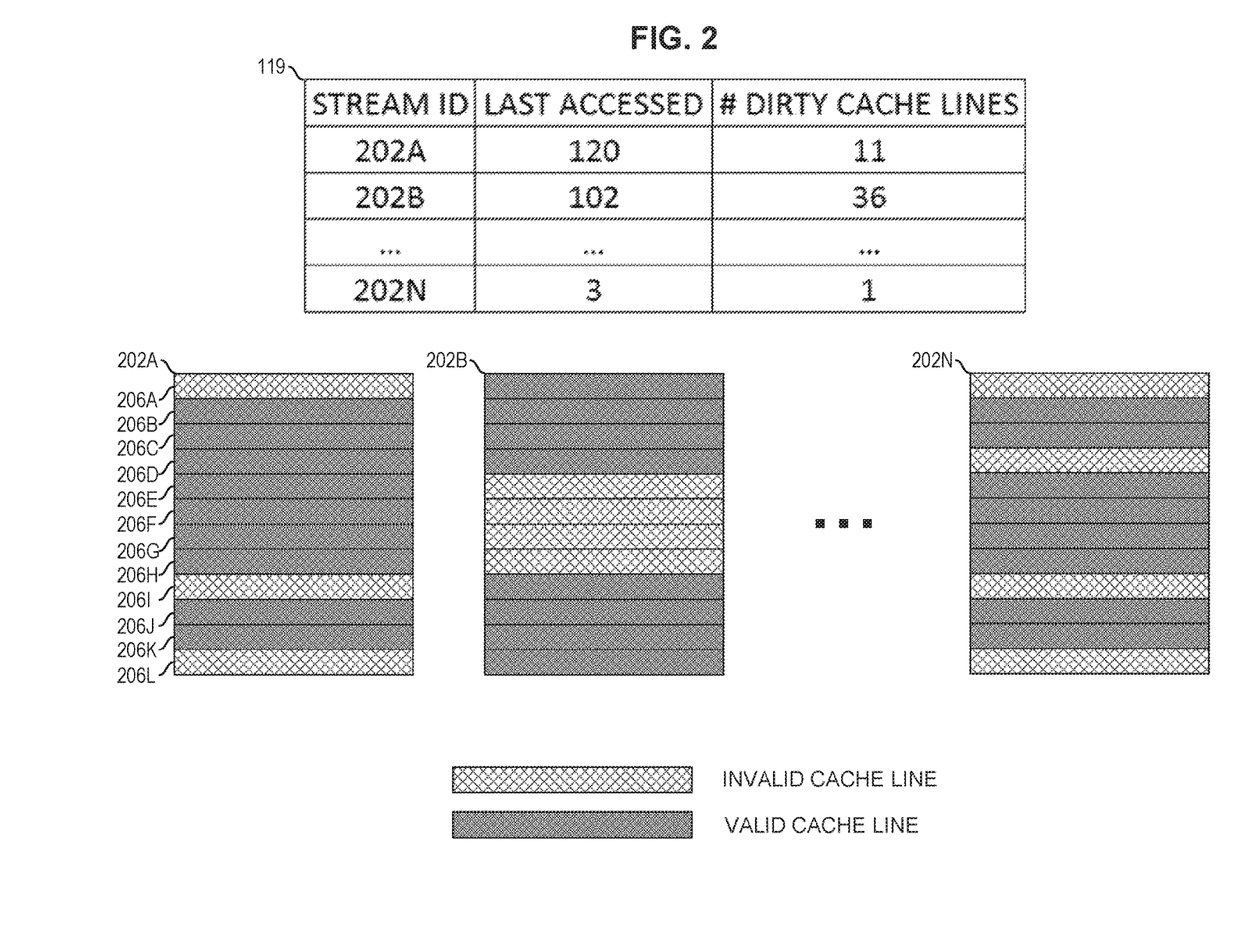
FIG. 2 illustrates an example eviction list and stream blocks in accordance with certain embodiments.

FIG. 2 illustrates an example eviction list 119 and stream blocks 202A-C in accordance with certain embodiments. In particular embodiments, the eviction list 119 may be maintained by the host (e.g., by cache controller 115) and may comprise entries referencing stream blocks 202, where each stream block comprises data stored in cache storage device 106. A stream block is a logical grouping of data that is stored on a single erase block of cache storage device 106. For example, a first stream identifier may reference stream block 202A, a second stream identifier may reference stream block 202B, and so on. Each stream block may be identified by a unique stream identifier (i.e., at least in some embodiments a stream identifier may not reference more than one stream block). When a host sends a write request to the cache storage device 106, the host may include a stream identifier with the write request. A write request specifying the stream identifier of stream block 202A instructs the cache storage device 106 to store the data specified by the write request to the erase block of cache storage device 106 dedicated to the stream block 202A, a write request specifying the stream identifier of stream block 202B instructs the cache storage device 106 to store the data specified by the write request to the erase block of cache storage device 106 dedicated to the stream block 202B, and so on.

As indicated by FIG. 2, a stream block 202A may include a plurality of cache lines 206A-206L stored by cache storage device 106 (a stream block may include any suitable number of cache lines). A cache line 206 may include one or more logical blocks of data. As represented, some of the cache lines 206 of a stream block 202 may be valid (i.e., contain data which has not been overwritten in the cache storage device 106) and some may be invalid (e.g., an invalid cache lines may contain previously valid data which has been overwritten by writing to a different cache line).

In various embodiments, an eviction list 119 maintained by the host (e.g., by cache controller 115) comprises data allowing the determination of the next stream block to evict when space is needed to cache newly requested data in cache storage device 106. For example, the eviction list 119 may include any suitable identifiers of the stream blocks (such as the stream identifiers used in the write commands or other suitable identifiers) and (if applicable) metadata associated with the identifiers. For example, the metadata may include an indication of when the stream block was last accessed (e.g., an amount of time that has passed since any cache line of the stream block was accessed), the number of dirty cache lines in the stream block, a frequency with which the stream block has been accessed (not shown), or other suitable metadata. In some embodiments, the identifiers of the stream blocks may be ordered in a data structure based on one or more metrics (such as the amount of time since the stream block was last accessed, the frequency with which the stream block has been accessed, the number of dirty cache lines in the stream block, etc.). When a stream block is to be evicted, the eviction list 119 may be consulted and the stream block to evict may be selected based on any suitable metric or combination of metrics. In one example, the stream block that is the least recently used (LRU) stream block may be the stream block selected for eviction. In other examples, the stream block to be evicted is selected based on a most recently used (MRU) scheme, least frequently used scheme, re-reference interval prediction (RRIP) scheme, random scheme, or other suitable scheme. In particular embodiments, the stream block to evict is selected based, at least in part, on the number of dirty cache lines in the stream block (as will be explained later, dirty cache lines must be processed before the stream block may be evicted, thus stream blocks with more dirty cache lines require relatively greater processing time during eviction). In one embodiment, the stream block to evict is selected based on a combination of the amount of time since the stream block was last accessed and the number of dirty cache lines in the stream block (e.g., a weight may be applied to each metric and the resulting sum may be compared against similar sums calculated for other stream blocks). The eviction process is described in more detail in connection with FIG. 4.

Figure 3:
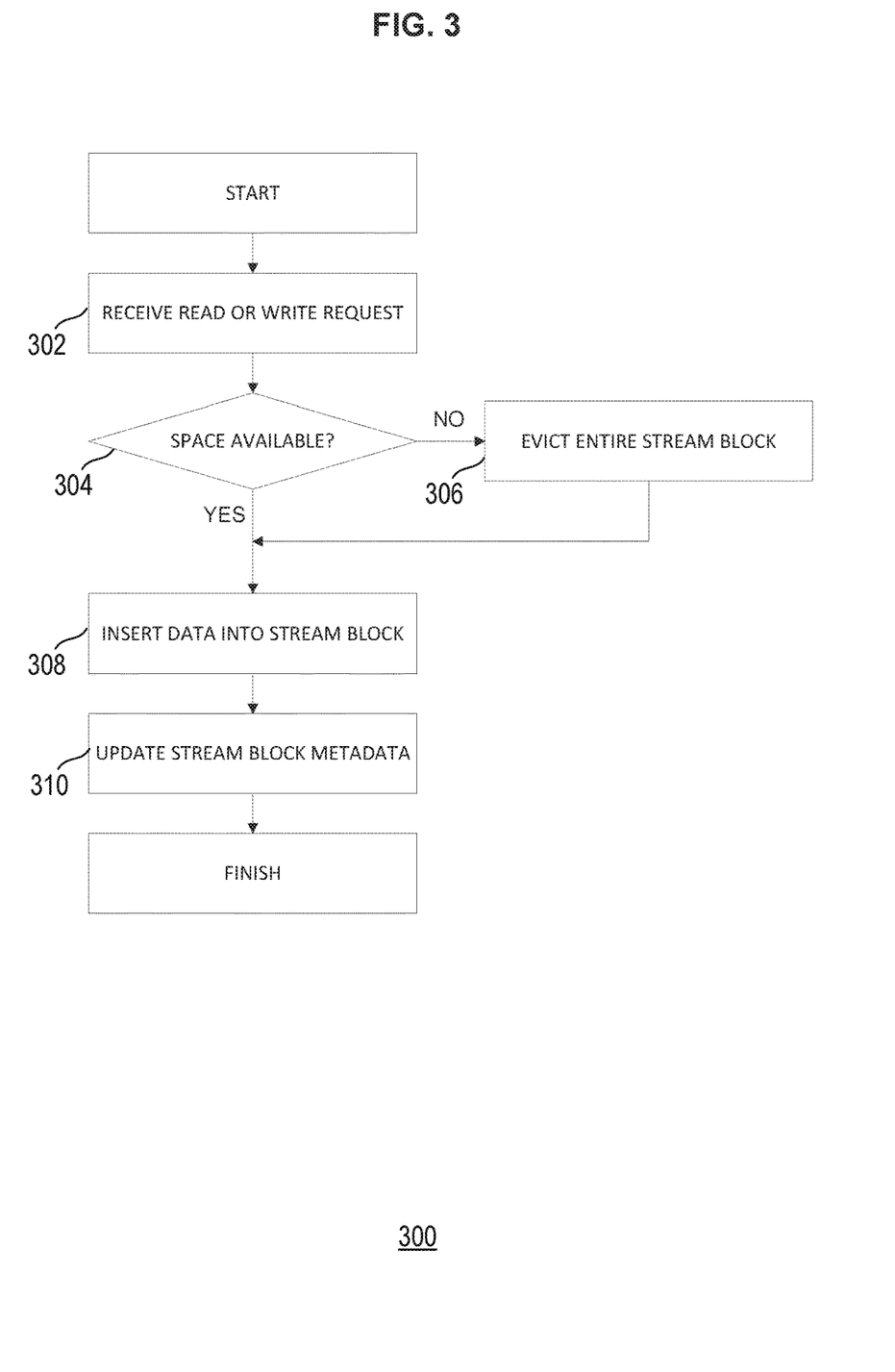
FIG. 3 illustrates an example flow for inserting a cache line into a cache storage device in accordance with certain embodiments.

FIG. 3 illustrates an example flow 300 for inserting a cache line into a cache storage device 106 in accordance with certain embodiments. Various operations of flow 300 may be performed by any suitable logic of system 100, such as cache controller 115 of CPU 102.

At 302, a read or write request is received. For example, an application 113 may issue a read or write request specifying one or more LBAs, one or more logical blocks of data (if the request is a write request), and a stream identifier identifying a stream block (in other embodiments, cache controller 115 may add the stream identifier to the request, e.g., based on the application issuing the request or other suitable basis). If the data specified in the request is not stored by CPU 102 (e.g., in a lower level cache or in system memory device 107), then cache controller 115 may determine whether the requested data is stored by cache storage device 106 (e.g., based on the contents of cache map 117). When cache controller 115 determines that the specified data is not included in the cache storage device 106, the data is requested from primary storage device 108 (in the case of a read request) or written to primary storage device 108 and cached in one or more caches of system 100 (including cache storage device 106).

At 304, prior to caching the requested data at cache storage device 106, a determination is made as to whether space is available on the cache storage device 106 to store the data specified by the request. This determination may be made in any suitable manner. In one example, a determination that space is available is made when the cache storage device 106 includes any unoccupied logical blocks to which the data may be written. As another example, a determination that space is available is made when a stream block referenced by a stream identifier in the request includes one or more unused logical blocks that may store the data and a determination that space is not available is made when the stream block does not include logical blocks for the data. As another example, a determination that space is available may be made when a request includes a new stream identifier (i.e., a stream identifier that is not currently used to reference a stream block stored in cache storage device 106) and at least one erase block is available to store a new stream block while a determination that space is not available is made when all erase blocks that may be used to store stream blocks are already in use. In various embodiments, a portion of the erase blocks of cache storage device 106 may be used to store stream blocks while one or more of the remaining erase blocks may be used to store other data (e.g., data rewritten from an evicted stream block in anticipation of erasing the corresponding erase block or data from requests that do not specify a stream identifier). In some embodiments, even though space may be available on one of the erase blocks that is not used as a stream block, a determination that space is not available to store data associated with a request may be made unless an erase block corresponding to a stream identifier of the request includes available space for the data.

If space is not available, an entire stream block is evicted at 306. The eviction process is described in more detail in connection with FIG. 4. If space is available, the data is inserted as one or more cache lines into a stream block (e.g., the stream block identified by the stream identifier of the request) at 308. This operation may include allocating a new stream block if an existing stream block for the stream identifier does not exist. When a stream block is evicted at 306 prior to insertion of the data, the new stream block may be stored on an erase block that was erased pursuant to the eviction (or other erase block if that erase block is not yet available).

At 310, metadata associated with the stream block is updated. For example, cache map 117 may be updated to map the LBA(s) used to request the data from the primary storage device 108 to the LBA(s) used to write the data to the cache storage device 106 (i.e., the LBA of the cache line). As another example, if the data written to the cache storage device 106 overwrites data already cached in cache storage device 106, then the logical block(s) of cache storage device 106 that were overwritten may be marked as invalid in the cache map 117 and the logical blocks of the cache storage device 106 to which the data was written may be marked as valid in the cache map 117.

The flow described in FIG. 3 is merely representative of operations that may occur in particular embodiments. In other embodiments, additional operations may be performed by the components of system 100. For example, data from various read or write requests may be inserted into different stream blocks of cache storage device 106 simultaneously (e.g., using different banks of cache storage device 106) in order to improve throughput. Various embodiments of the present disclosure contemplate any suitable signaling mechanisms for accomplishing the functions described herein. Some of the operations illustrated in FIG. 3 may be repeated, combined, modified or deleted where appropriate. Additionally, operations may be performed in any suitable order without departing from the scope of particular embodiments.

Figure 4:
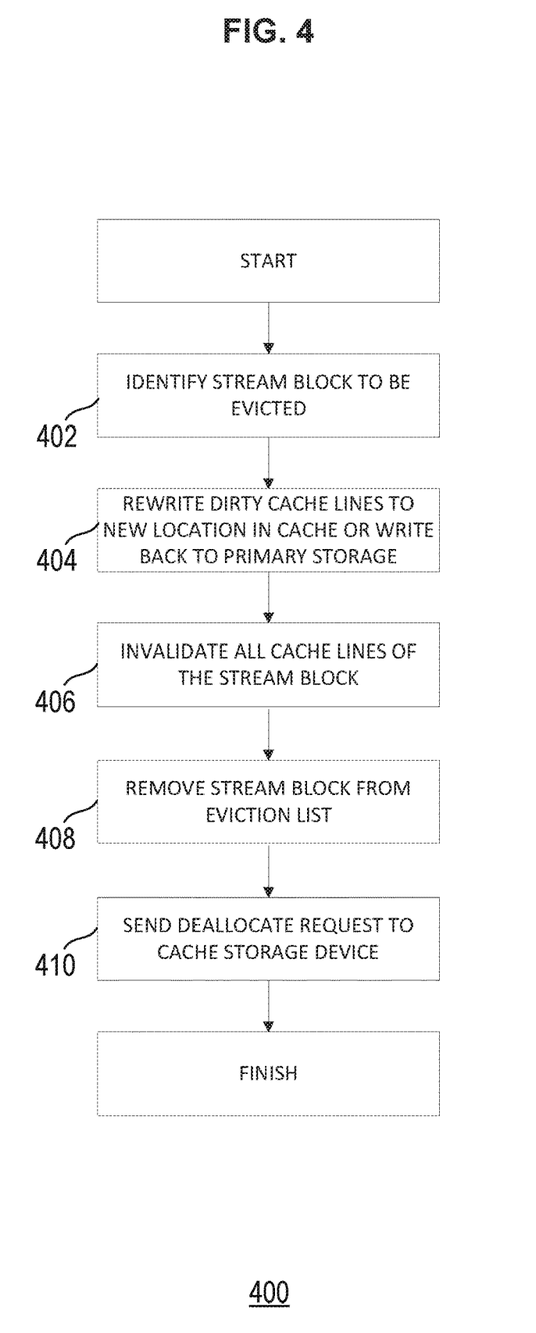
FIG. 4 illustrates an example flow for evicting a stream block from a cache storage device 106 in accordance with certain embodiments.

FIG. 4 illustrates an example flow 400 for evicting a stream block from a cache storage device 106 in accordance with certain embodiments. Various operations of flow 400 may be performed by any suitable logic of system 100, such as cache controller 115 of CPU 102.

At 402, a stream block of the cache storage device 106 to be evicted is identified. As discussed above, the stream block to be evicted may be selected using any suitable eviction scheme, such as a least recently used scheme. In a particular embodiment, the determination of which stream block to evict is based on how many cache lines of the stream block are dirty (i.e., store data that has been changed by CPU 102 but not yet updated at primary storage device 108) in order to reduce the amount of work to be performed by the cache storage device 106 during eviction (since the dirty cache lines of the stream block to be evicted are rewritten at 404). In some embodiments, the number of dirty cache lines of the streams blocks may be used in conjunction with other metrics (such as when the stream blocks were last accessed) to determine the stream block to evict. For example, if two stream blocks include the same number of dirty cache lines, the stream block that was used least recently may be selected for eviction. In various embodiments, an eviction list and/or other metadata associated with the stream blocks may be accessed to determine the stream block to evict.

At 404, the dirty cache lines (i.e., the cache lines storing data that has been changed by CPU 102 but not yet updated at primary storage device 108) of the stream block to be evicted (if such dirty cache lines exist), are either rewritten to a different physical location of the cache storage device 106 (e.g., to an erase block that is not dedicated to a particular stream block) or written back to the primary storage device 108 such that changes to the underlying data is not lost during the eviction. The clean cache lines (i.e., those that have not been changed since retrieval from primary storage device 108) do not need to be rewritten as primary storage device 108 already stores the most current version of this data. In various embodiments, the determination of whether to write the dirty cache lines to a different location of cache storage device 106 or to primary storage device 108 is based on an amount of available bandwidth at cache storage device 106, available bandwidth at primary storage device 108, available bandwidth on a connection between cache storage device 106 and primary storage device 108, other suitable metric, or any combination thereof. For example, if the cache storage device 106 is fully (or heavily) utilized, the data may be written to the primary storage device 108. As another example, if the cache storage device 106 has available bandwidth, the dirty cache lines may be rewritten to another location within cache storage device 106.

At 406, all cache lines of the stream block are invalidated. For example, an indicator for each cache line of the stream block may be set to invalid in the cache map 117. At 408, the stream block may be removed from the eviction list (e.g., by removing a representation of the stream block from a data structure storing the eviction list) and the corresponding stream identifier may be freed for reuse at a later time.

At 410, a deallocate request is sent from cache controller 115 to the cache storage device 106. The deallocate request may specify a set of LBAs of logical blocks of the stream block. The deallocate request informs the cache storage device 106 that the specified logical blocks are no longer valid. Because the logical blocks of the stream block were placed together on the same erase block as a result of the inclusion of the stream identifier with each write request associated with the stream block, the entire erase block is invalid and may then be erased by the cache storage device 106 (either immediately upon receiving the deallocate request or soon thereafter, e.g., during a scheduled garbage collection operation by the cache storage device 106). In a particular embodiment, the deallocate request is a TRIM command which specifies a set of logical block addresses which could be a consecutive range of addresses or a sparse set of addresses.

The flow described in FIG. 4 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 4 may be repeated, combined, modified or deleted where appropriate. Additionally, operations may be performed in any suitable order without departing from the scope of particular embodiments.

Figure 5:
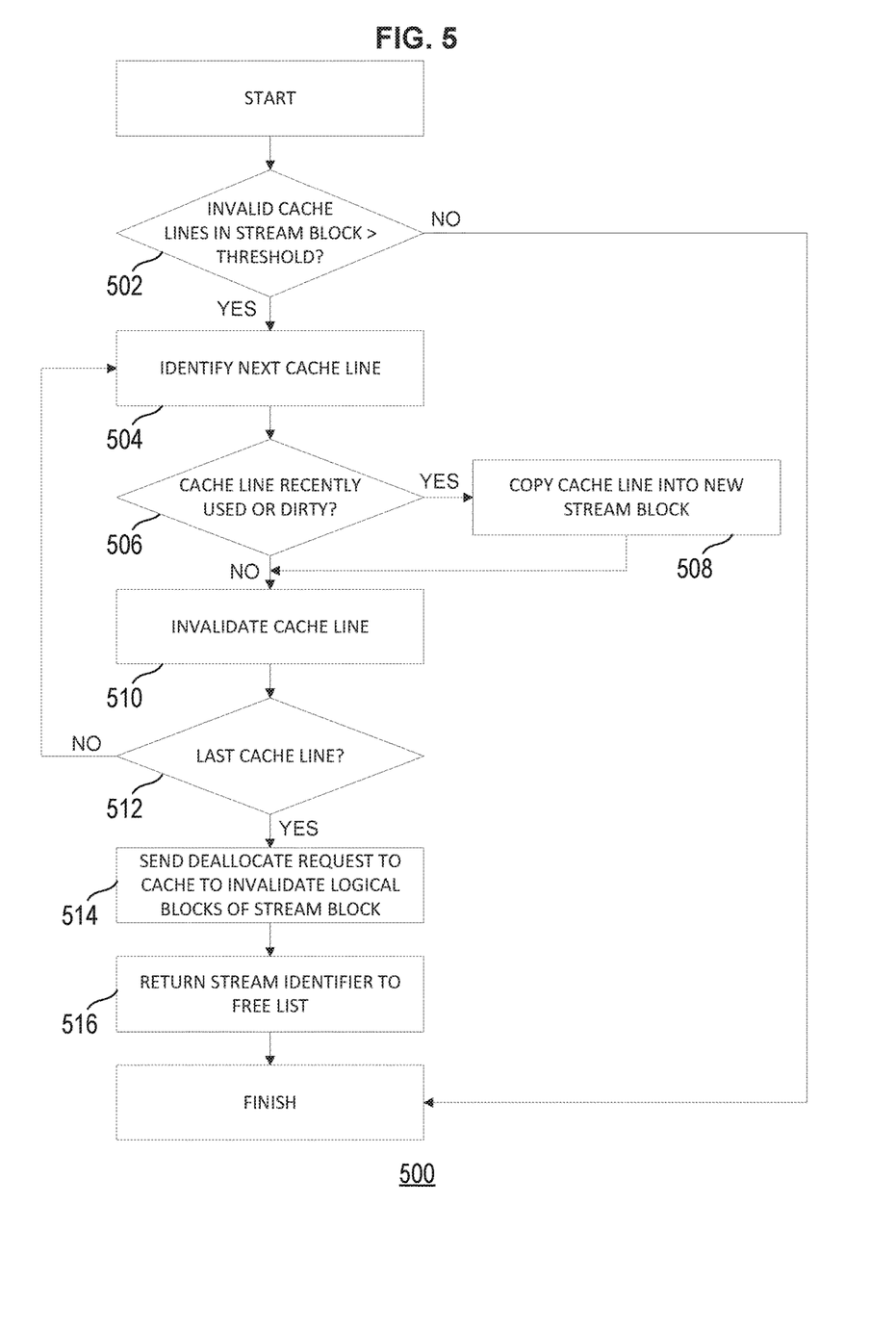
FIG. 5 illustrates an example flow for performing garbage collection in accordance with certain embodiments.

FIG. 5 illustrates an example flow 500 for performing garbage collection in accordance with certain embodiments. Various operations of flow 500 may be performed by any suitable logic of system 100, such as cache controller 115 of CPU 102.

Garbage collection may be performed by the host to reclaim erase blocks with low utilization (e.g., that include a high percentage of invalid logical blocks). Invalidation of logical blocks may occur as a result of cache insertions, for example when existing data in the cache is overwritten by user data. Garbage collection may be performed at any suitable time and may be triggered by any suitable event. For example, garbage collection may be started by a user of the CPU 102 via a user interface by selecting an option to begin garbage collection. As another example, garbage collection may be triggered when the cache storage device 106 is idle (e.g., is not processing any read or write requests). As another example, garbage collection may be scheduled to be performed periodically at a particular time (e.g., at night when the utilization of the cache storage device 106 is expected to be low).

At 502, a determination is made as to whether a number of invalid cache lines in a stream block is greater than a threshold amount. Any suitable threshold amount may be used. As just one example, the threshold amount may be 90% of the total number of cache lines in a stream block. If the number of invalid cache lines is not greater than the threshold amount, then garbage collection is not performed on the stream block and the flow ends (for that particular stream block).

If the number of invalid cache lines in the stream block is greater than the threshold, then a cache line is identified at 504. At 506, a determination is made as to whether the identified cache line has been recently used (e.g., based on an indicator of how long it has been since the cache line was last accessed) or is dirty. If the cache line was recently used or is dirty, the cache line is copied into a new stream block at 508. For example, a different erase block may be allocated to store the stream block (i.e., to store writes including the stream identifier of the stream block). As an alternative, the cache line may be copied into a portion of the cache storage device that is not dedicated to stream blocks. At 510, the cache line is invalidated (e.g., by marking the cache line as invalid in cache map 117). At 512, a determination is made as to whether the cache line is the last cache line of the stream block. If the cache line is not the last cache line, the flow returns to 506.

If the cache line is the last cache line of the stream block, a deallocate request is sent from cache controller 115 to the cache storage device 106 at 514. The deallocate request may specify a set of LBAs of logical blocks of the stream block. The deallocate request informs the cache storage device 106 that the specified logical blocks are no longer valid. Because the logical blocks of the stream block were placed together on the same erase block as a result of the inclusion of the stream identifier with each write request associated with the stream block, the entire erase block is invalid and may then be erased by the cache storage device 106 (either immediately upon receiving the deallocate request or soon thereafter, e.g., during a scheduled garbage collection operation by the cache storage device 106). In a particular embodiment, the deallocate request is a TRIM command which specifies a set of logical block addresses which could be a consecutive range of addresses or a sparse set of addresses. At 516, the stream identifier is returned to a free list such that the stream identifier may be used for a new stream.

During garbage collection, the flow 500 may be performed any number of times (e.g., for each stream block or a subset of the stream blocks). In a particular embodiment, cache controller 115 may maintain a data structure (e.g., a max heap) including representations of each stream block, wherein the data structure is ordered by the number of invalid cache lines in each stream block. Starting with the stream block at the top of the heap, flow 500 may be performed for each stream block until a determination is made that a stream block does not include a number of dirty cache lines greater than the threshold (because the data structure is ordered, the remaining stream blocks will also include a number of dirty cache lines that is under the threshold amount).

The flow described in FIG. 5 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 5 may be repeated, combined, modified or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the flows (e.g., flows 300, 400, or 500) or functionality of any of the various components depicted throughout the figures, such as cache controller 115, application 113, operating system 111, storage device controller 118, other component described herein. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, a processor comprises a processing core; and a cache controller to send a plurality of write requests to a cache storage device to store cache lines of a stream block, the plurality of write requests each including a stream identifier of the stream block, wherein a capacity of the stream block is equal to a capacity of an erase block of the cache storage device and wherein the erase block is dedicated to storing cache lines of the stream block; determine to evict the stream block from the cache storage device based upon a determination that space is not available in the cache storage device to cache data received from a first storage device; and send a deallocation request to the cache storage device to deallocate all cache lines of the stream block to enable the cache storage device to erase the erase block.

In an embodiment, the cache controller is to maintain a cache map that maps the cache lines of the stream block to logical blocks of data of the first storage device. In an embodiment, the cache controller is to mark all valid cache lines of the stream block as invalid in the cache map based on the determination to evict the stream block from the cache storage device. In an embodiment, the cache controller is to send at least one write request to the cache storage device to rewrite dirty cache lines of the stream block to different locations on the cache storage device prior to sending the deallocation request to the cache storage device. In an embodiment, the cache controller is to send at least one write request to the first storage device to update logical blocks of data corresponding to dirty cache lines of the stream block prior to sending the deallocation request to the cache storage device. In an embodiment, a determination to send the at least one write request to the cache storage device is based on at least one of available bandwidth of the cache storage device or available bandwidth of the first storage device. In an embodiment, a determination to send the at least one write request to the first storage device is based on at least one of available bandwidth of the cache storage device or available bandwidth of the first storage device. In an embodiment, the cache controller is to select the stream block for eviction from among a plurality of stream blocks based on an amount of time since a cache line of the stream block was accessed. In an embodiment, the cache controller is to determine that a number of invalid cache lines of a second stream block is greater than a predetermined threshold; copy at least one valid cache line of the second stream block to a different location of the cache storage device; and send a second deallocation request to the cache storage device to deallocate all cache lines of the second stream block to enable the cache storage device to erase a second erase block storing the cache lines of the second stream block. In an embodiment, the cache storage device comprises NAND flash storage media to store the cache lines of the stream block.

In at least one embodiment, a method comprises sending a plurality of write requests to a cache storage device to store cache lines of a stream block, the plurality of write requests each including a stream identifier of the stream block, wherein a capacity of the stream block is equal to a capacity of an erase block of the cache storage device and wherein the erase block is dedicated to storing cache lines of the stream block; determining to evict the stream block from the cache storage device based upon a determination that space is not available in the cache storage device to cache data received from a first storage device; and sending a deallocation request to the cache storage device to deallocate all cache lines of the stream block to enable the cache storage device to erase the erase block.

In an embodiment, the method further comprises maintaining a cache map that maps the cache lines of the stream block to logical blocks of data of the first storage device. In an embodiment, the method further comprises marking all valid cache lines of the stream block as invalid in the cache map based on the determination to evict the stream block from the cache storage device. In an embodiment, the method further comprises sending at least one write request to the cache storage device to rewrite dirty cache lines of the stream block to different locations on the cache storage device prior to sending the deallocation request to the cache storage device. In an embodiment, the method further comprises sending at least one write request to the first storage device to update logical blocks of data corresponding to dirty cache lines of the stream block prior to sending the deallocation request to the cache storage device. In an embodiment, a determination to send the at least one write request to the cache storage device is based on at least one of available bandwidth of the cache storage device or available bandwidth of the first storage device. In an embodiment, a determination to send the at least one write request to the first storage device is based on at least one of available bandwidth of the cache storage device or available bandwidth of the first storage device. In an embodiment, the method further comprises selecting the stream block for eviction from among a plurality of stream blocks based on an amount of time since a cache line of the stream block was accessed. In an embodiment, the method further comprises determining that a number of invalid cache lines of a second stream block is greater than a predetermined threshold; copying at least one valid cache line of the second stream block to a different location of the cache storage device; and sending a second deallocation request to the cache storage device to deallocate all cache lines of the second stream block to enable the cache storage device to erase a second erase block storing the cache lines of the second stream block. In an embodiment, the cache storage device comprises NAND flash storage media to store the cache lines of the stream block.

In at least one embodiment, a non-transitory machine readable storage medium includes instructions stored thereon, the instructions when executed by a machine to cause the machine to send a plurality of write requests to a cache storage device to store cache lines of a stream block, the plurality of write requests each including a stream identifier of the stream block, wherein a capacity of the stream block is equal to a capacity of an erase block of the cache storage device and wherein the erase block is dedicated to storing cache lines of the stream block; determine to evict the stream block from the cache storage device based upon a determination that space is not available in the cache storage device to cache data received from a first storage device; and send a deallocation request to the cache storage device to deallocate all cache lines of the stream block to enable the cache storage device to erase the erase block. In an embodiment, the instructions when executed further cause the machine to maintain a cache map that maps the cache lines of the stream block to logical blocks of data of the first storage device. In an embodiment, the instructions when executed further cause the machine to mark all valid cache lines of the stream block as invalid in the cache map based on the determination to evict the stream block from the cache storage device. In an embodiment, the instructions when executed further cause the machine to send at least one write request to the cache storage device to rewrite dirty cache lines of the stream block to different locations on the cache storage device prior to sending the deallocation request to the cache storage device. In an embodiment, the instructions when executed further cause the machine to send at least one write request to the first storage device to update logical blocks of data corresponding to dirty cache lines of the stream block prior to sending the deallocation request to the cache storage device.

In at least one embodiment, a computer system comprises a processing core; a cache storage device; and a cache controller to send a plurality of write requests to the cache storage device to store cache lines of a stream block, the plurality of write requests each including a stream identifier of the stream block, wherein a capacity of the stream block is equal to a capacity of an erase block of the cache storage device and wherein the erase block is dedicated to storing cache lines of the stream block; determine to evict the stream block from the cache storage device based upon a determination that space is not available in the cache storage device to cache data received from a first storage device; and send a deallocation request to the cache storage device to deallocate all cache lines of the stream block; and wherein the cache storage device is to erase the erase block at least partly in response to the deallocation request.

In an embodiment, the computer system further comprises the first storage device. In an embodiment, the cache controller is to maintain a cache map that maps the cache lines of the stream block to logical blocks of data of the first storage device; and mark all valid cache lines of the stream block as invalid in the cache map based on the determination to evict the stream block from the cache storage device. In an embodiment, the cache controller is to send at least one write request to the cache storage device to rewrite dirty cache lines of the stream block to different locations on the cache storage device prior to sending the deallocation request to the cache storage device. In an embodiment, the cache controller is to send at least one write request to the first storage device to update logical blocks of data corresponding to dirty cache lines of the stream block prior to sending the deallocation request to the cache storage device.

In at least one embodiment, a system comprises means to send a plurality of write requests to a cache storage device to store cache lines of a stream block, the plurality of write requests each including a stream identifier of the stream block, wherein a capacity of the stream block is equal to a capacity of an erase block of the cache storage device and wherein the erase block is dedicated to storing cache lines of the stream block; means to determine to evict the stream block from the cache storage device based upon a determination that space is not available in the cache storage device to cache data received from a first storage device; and means to send a deallocation request to the cache storage device to deallocate all cache lines of the stream block to enable the cache storage device to erase the erase block.

In an embodiment, the system further comprises means to maintain a cache map that maps the cache lines of the stream block to logical blocks of data of the first storage device. In an embodiment, the system further comprises means to mark all valid cache lines of the stream block as invalid in the cache map based on the determination to evict the stream block from the cache storage device. In an embodiment, the system further comprises means to send at least one write request to the cache storage device to rewrite dirty cache lines of the stream block to different locations on the cache storage device prior to sending the deallocation request to the cache storage device. In an embodiment, the system further comprises means to send at least one write request to the first storage device to update logical blocks of data corresponding to dirty cache lines of the stream block prior to sending the deallocation request to the cache storage device.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
    a processing core; and
    a cache controller to:
        send a plurality of write requests to a cache storage device to store cache lines of a stream block, the plurality of write requests including a first write request to store a first cache line of the stream block and a second write request to store a second cache line of the stream block, the first write request and the second write request each including a stream identifier of the stream block, wherein a capacity of the stream block is equal to a capacity of an erase block of the cache storage device and wherein the erase block is dedicated to storing cache lines of the stream block;
        determine to evict the stream block from the cache storage device based upon a determination that space is not available in the cache storage device to cache data received from a first storage device; and
        send a deallocation request to the cache storage device to deallocate all cache lines of the stream block to enable the cache storage device to erase the erase block, wherein prior to sending the deallocation request the cache controller is to:
            send at least one write request to the cache storage device to rewrite dirty cache lines of the stream block to different locations on the cache storage device; or
            send at least one write request to the first storage device to update logical blocks of data corresponding to dirty cache lines of the stream block.

2. The processor of claim 1, wherein the cache controller is to maintain a cache map that maps the cache lines of the stream block to logical blocks of data of the first storage device.

3. The processor of claim 2, wherein the cache controller is to mark all valid cache lines of the stream block as invalid in the cache map based on the determination to evict the stream block from the cache storage device.

4. The processor of claim 1, wherein the cache controller is to send at least one write request to the cache storage device to rewrite dirty cache lines of the stream block to different locations on the cache storage device prior to sending the deallocation request to the cache storage device.

5. The processor of claim 1, wherein the cache controller is to send at least one write request to the first storage device to update logical blocks of data corresponding to dirty cache lines of the stream block prior to sending the deallocation request to the cache storage device.

6. The processor of claim 4, wherein a determination to send the at least one write request to the cache storage device is based on at least one of available bandwidth of the cache storage device or available bandwidth of the first storage device.

7. The processor of claim 5, wherein a determination to send the at least one write request to the first storage device is based on at least one of available bandwidth of the cache storage device or available bandwidth of the first storage device.

8. The processor of claim 1, wherein the cache controller is to select the stream block for eviction from among a plurality of stream blocks based on an amount of time since a cache line of the stream block was accessed.

9. The processor of claim 1, wherein the cache controller is to:
    determine that a number of invalid cache lines of a second stream block is greater than a threshold;
    copy at least one valid cache line of the second stream block to a different location of the cache storage device; and
    send a second deallocation request to the cache storage device to deallocate all cache lines of the second stream block to enable the cache storage device to erase a second erase block storing the cache lines of the second stream block.

10. The processor of claim 1, wherein the cache storage device comprises NAND flash storage media to store the cache lines of the stream block.

11. A non-transitory machine readable storage medium having instructions stored thereon, the instructions when executed by a machine to cause the machine to:
send a plurality of write requests to a cache storage device to store cache lines of a stream block, the plurality of write requests including a first write request to store a first cache line of the stream block and a second write request to store a second cache line of the stream block, the first write request and the second write request each including a stream identifier of the stream block, wherein a capacity of the stream block is equal to a capacity of an erase block of the cache storage device and wherein the erase block is dedicated to storing cache lines of the stream block;
determine to evict the stream block from the cache storage device based upon a determination that space is not available in the cache storage device to cache data received from a first storage device; and
send a deallocation request to the cache storage device to deallocate all cache lines of the stream block to enable the cache storage device to erase the erase block, wherein prior to sending the deallocation request the machine is to:
send at least one write request to the cache storage device to rewrite dirty cache lines of the stream block to different locations on the cache storage device; or
send at least one write request to the first storage device to update logical blocks of data corresponding to dirty cache lines of the stream block.

12. The storage medium of claim 11, the instructions when executed to further cause the machine to maintain a cache map that maps the cache lines of the stream block to logical blocks of data of the first storage device.

13. The storage medium of claim 12, the instructions when executed to further cause the machine to mark all valid cache lines of the stream block as invalid in the cache map based on the determination to evict the stream block from the cache storage device.

14. The storage medium of claim 11, the instructions when executed to further cause the machine to send at least one write request to the cache storage device to rewrite dirty cache lines of the stream block to different locations on the cache storage device prior to sending the deallocation request to the cache storage device.

15. The storage medium of claim 11, the instructions when executed to further cause the machine to send at least one write request to the first storage device to update logical blocks of data corresponding to dirty cache lines of the stream block prior to sending the deallocation request to the cache storage device.

16. A computer system comprising:
a processing core;
a cache storage device; and
a cache controller to:
send a plurality of write requests to the cache storage device to store cache lines of a stream block, the plurality of write requests including a first write request to store a first cache line of the stream block and a second write request to store a second cache line of the stream block, the first write request and the second write request each including a stream identifier of the stream block, wherein a capacity of the stream block is equal to a capacity of an erase block of the cache storage device and wherein the erase block is dedicated to storing cache lines of the stream block;
determine to evict the stream block from the cache storage device based upon a determination that space is not available in the cache storage device to cache data received from a first storage device; and
send a deallocation request to the cache storage device to deallocate all cache lines of the stream block, wherein prior to sending the deallocation request the cache controller is to:
send at least one write request to the cache storage device to rewrite dirty cache lines of the stream block to different locations on the cache storage device; or
send at least one write request to the first storage device to update logical blocks of data corresponding to dirty cache lines of the stream block;
and wherein the cache storage device is to erase the erase block at least partly in response to the deallocation request.

17. The computer system of claim 16, further comprising the first storage device.

18. The computer system of claim 16, wherein the cache controller is to:
maintain a cache map that maps the cache lines of the stream block to logical blocks of data of the first storage device; and
mark all valid cache lines of the stream block as invalid in the cache map based on the determination to evict the stream block from the cache storage device.

19. The computer system of claim 16, wherein the cache controller is to send at least one write request to the cache storage device to rewrite dirty cache lines of the stream block to different locations on the cache storage device prior to sending the deallocation request to the cache storage device.

20. The computer system of claim 16, wherein the cache controller is to send at least one write request to the first storage device to update logical blocks of data corresponding to dirty cache lines of the stream block prior to sending the deallocation request to the cache storage device.

21. The processor of claim 1, wherein the deallocation request sent by the cache controller to the cache storage device comprises a set of logical block addresses of the stream block.

* * * * *